United States Patent [19]
Brown

[11] Patent Number: 5,390,101
[45] Date of Patent: Feb. 14, 1995

[54] FLYBACK POWER SUPPLY HAVING A VCO CONTROLLED SWITCHING RATE

[75] Inventor: Martin J. Brown, Scottsdale, Ariz.

[73] Assignee: Motorola, Inc., Schaumburg, Ill.

[21] Appl. No.: 177,689

[22] Filed: Jan. 4, 1994

[51] Int. Cl.[6] .......................................... H02M 3/335
[52] U.S. Cl. ................................................ 363/20
[58] Field of Search ...................... 363/20, 21, 97, 131

[56] References Cited

U.S. PATENT DOCUMENTS

| | | | |
|---|---|---|---|
| 4,347,559 | 8/1982 | Sturgeon | 363/21 |
| 4,996,638 | 2/1991 | Orr | 363/21 |
| 5,029,269 | 7/1991 | Elliott et al. | 363/21 |

Primary Examiner—Steve L. Stephan
Assistant Examiner—E. To
Attorney, Agent, or Firm—Robert D. Atkins

[57] ABSTRACT

A DC-DC current-mode controlled flyback switching power supply provides a high efficiency of operation throughout a wide range of input voltages. An error amplifier produces an error signal from the difference between a reference voltage and an output voltage feedback signal. The error signal controls a VCO that sets a latch to enable a power switch to store power in a flyback transformer. A comparator compares the error signal against a current sense feedback signal indicating the current flowing through the power switch. The comparator resets the latch and disables the power switch to transfer the stored energy in the flyback transformer to the output of the power supply. The extended input range of operation is achieved by varying the switching frequency of the DC-DC converter through the use of the VCO to accommodate varying input voltages and loading.

18 Claims, 1 Drawing Sheet

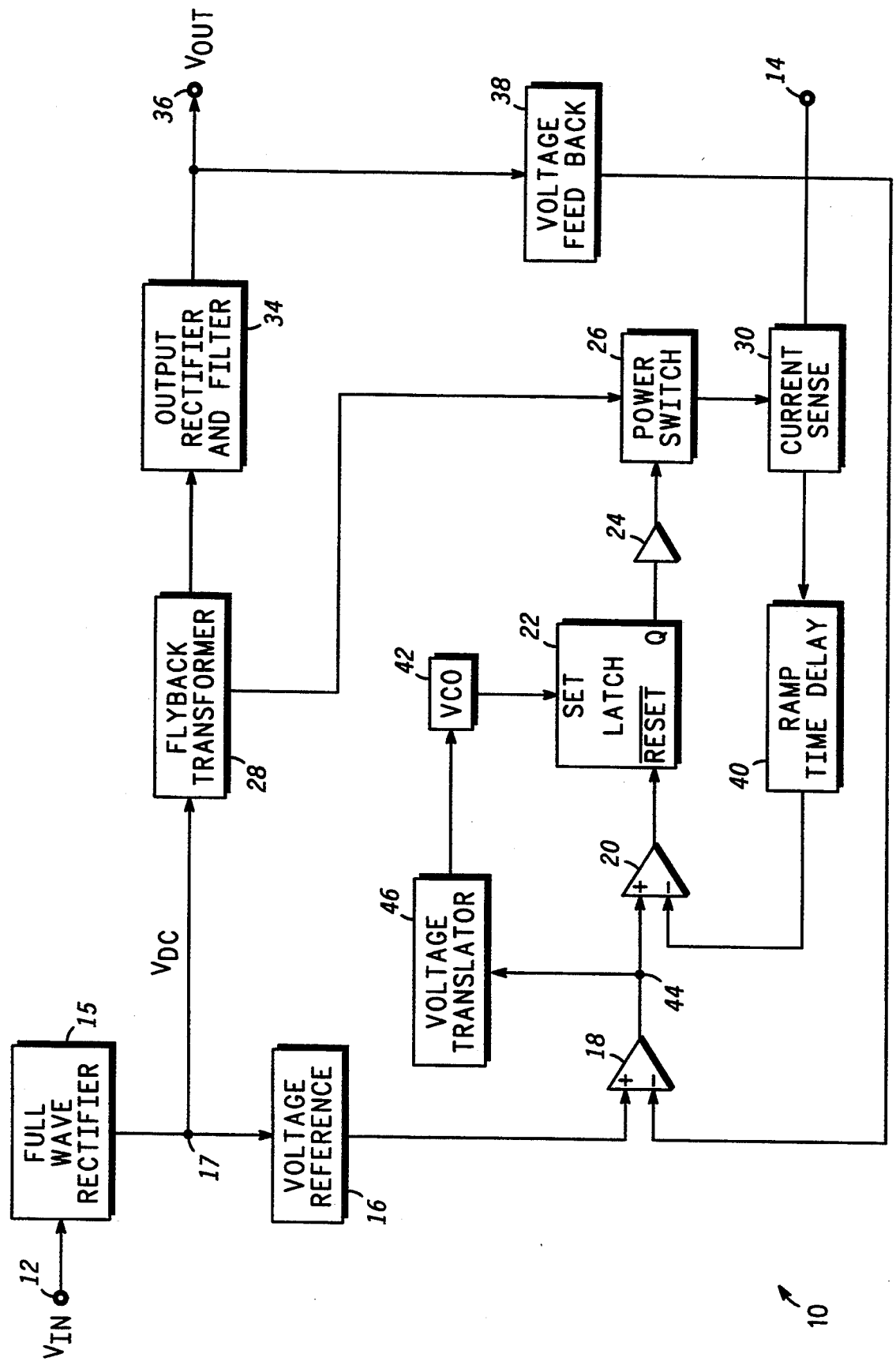

FLYBACK POWER SUPPLY HAVING A VCO CONTROLLED SWITCHING RATE

BACKGROUND OF THE INVENTION

The present invention relates in general to voltage regulators and, more particularly, to a DC-DC current-mode controlled flyback switching power supply.

The use of switching-type power supplies in residential and commercial applications for DC-DC voltage conversion is highly desirable due to advantages, such as increased efficiency, decreased size, and decreased weight of the switching supply over traditional linear-type power supplies. Switching power supplies become more cost effective in comparison to an equivalent linear power supplies as the electrical load power requirement increases above say 20 watts.

In general, the switching power supply converts an unregulated DC input voltage to the desired DC output voltage. A rectifier stage may be included prior to the switching power supply to convert an AC voltage into the unregulated DC input voltage. The input voltages for switching supply conversion typically range from 90 to 130 volts AC in the United States, Canada, and Japan; 220 to 240 volts AC in Europe; and 400 to 600 volts AC for worldwide industrial applications. The AC voltages once rectified correspond to DC voltages ranging from 100 to 850 volts DC. The switching power supply produces DC output voltages of say 24 volts or less.

To accommodate the wide range of input voltages, the prior art has used a variety of power supply designs to achieve optimum performance. For example, forward-mode switching converter supplies are typically used to accommodate input voltages with the range of 90 to 130 volts AC. It is well known in the art that for a forward-mode converter with a fixed load, as input line voltage increases, the duty cycle of the switching converter can decrease to a value as small as 3%. In addition, a large power switching transistor, with characteristically large junction capacitance, is utilized to facilitate the load supply current. Since the transistor is typically switching at a rate of 100 kilohertz, the low duty cycle will not permit the transistor to turn-on completely, thus resulting in loss of efficient operation.

The boost-mode flyback power supply optimizes power conversion for larger ranges of input line voltages encompassing from 90 to 240 volts AC. It is known that boost-mode supplies are limited in operating voltage range due to circuit limitations imposed by core related energy transfer requirements. It is also known, for example, a boost mode flyback supply designed to operate with a 50% duty cycle at 90 volts AC experiences deterioration to a duty cycle of 3% at 240 volts AC resulting in a significant loss of efficiency. Furthermore is understood that the increased input voltage demands of industrial power supply converters, 280 to 600 volts AC, require major circuit design modifications from typical lower voltage forward-mode and boost-mode flyback supply techniques to assure efficient operation for the higher range of operating voltages. Still another problem that exists for DC-DC converters is the performance variation caused by load variations.

Hence, a need exists for an efficient DC-DC switching power supply design that is capable of operating throughout a wide range of input voltages.

BRIEF DESCRIPTION OF THE DRAWING

The sole FIGURE is a block diagram illustrating a DC-DC current-mode controlled flyback switching power supply.

DETAILED DESCRIPTION OF THE PREFERRED EMBODIMENT

Generally, the present invention includes techniques that keep the power switch operating efficiently over a wide range of input voltages by holding its on-time for a longer period than the minimum effective on-time exhibited by the power switch controller. The longer on-time period is accomplished by lowering the operating frequency (on-times per second) of the power supply thus requiring the power switch to remain on for a longer period in order to maintain the same output power at higher input voltages.

In the sole figure, DC-DC converter 10 receives an AC input voltage applied between power supply conductors 12 and 14. The AC input voltage is converted to a DC input voltage $V_{DC}$ by full-wave rectifier 15 at node 17. In another embodiment rectifier 15 may be a half-wave type. The voltage $V_{DC}$ is applied at a primary windings power input of flyback transformer 28. The power output from the secondary windings of flyback transformer 28 is coupled to output rectifier and filter circuit 34. The output rectifier and filter circuit produces a DC output signal $V_{OUT}$ at node 36. The output voltage $V_{OUT}$ is 24 volts DC or less in the present embodiment although higher output voltages are considered within the scope of the present invention. DC-DC converter 10 may provide multiple output voltages by taping predetermined points of the secondary windings of flyback transformer 28.

The input voltage $V_{DC}$ is also applied to an input of voltage reference circuit 16 for providing a reference potential $V_{REF}$ at the non-inverting input of error amplifier 18. The inverting input of error amplifier 18 receives an output voltage feedback signal from the DC output voltage $V_{OUT}$ reduced by voltage feedback circuit 38. The output of error amplifier 18 is coupled to the non-inverting input of comparator 20 at node 44. The output of comparator 20 is coupled to the active-low reset input of latch 22. The Q-output of latch 22 is coupled to the input of buffer 24. The output of buffer 24 is coupled to the control input of power switch 26 which includes a current conduction path between the primary windings of flyback transformer 28 and current sense circuit 30. The power output of current sense circuit 30 returns to power supply conductor 14. The sense output of current sense circuit 30 provides a current sense signal to an input of ramp time delay circuit 40. Ramp time delay circuit 40 delays the current sense signal. The output of ramp time delay circuit 40 is coupled to the inverting input of comparator 20.

A key feature of the present invention is voltage controlled oscillator (VCO) 42 driving the set input of latch 22 in response to the error voltage developed at node 44. The input of voltage translator 46 is coupled to node 44 while its output is coupled to the control input of VCO 42. The output of VCO 42 is coupled to the set input of latch 22.

The operation of DC-DC converter 10 proceeds as follows. The AC input voltage $V_{IN}$ ranging from say 90 to 600 volts AC is full-wave rectified by rectifier 15 to produce the rectified input voltage $V_{DC}$ at node 17. Voltage reference 16 receives input voltage $V_{DC}$ and generates a stable and accurate reference voltage $V_{REF}$ at the non-inverting input of error amplifier 18 to be used as the reference that sets the output voltage $V_{OUT}$ at node 36. Error amplifier 18 maintains an accurate output voltage $V_{OUT}$ by comparing the reference voltage on its non-inverting input with the output voltage feedback signal from voltage feedback circuit 38 to generate an error voltage that sets (via VCO 42) and resets (via comparator 20) latch 22 to control the switching rate of power switch 26 which in turn controls the power transfer through flyback transformer 28.

The flyback transformer serves three main functions. The first function is to store energy from the input voltage source $V_{IN}$ when power switch 26 is turned on and then transfer the stored energy to output 36 when power switch 26 is turned off. The second function is to provide electrical isolation between the input circuits and the output circuits for safety reasons. The third function is to step-up or step-down the output voltage with respect to the input voltage. The output signal from flyback transformer 28 is stepped-up or stepped-down depending on the relative turns between the primary and secondary windings. Flyback transformer 28 is constructed by winding two or more wires around a loop of ferromagnetic material. One end of the primary winding receives the input voltage $V_{DC}$ and the other end is coupled to power switch 26, which serves to connect and disconnect the primary winding across the input voltage thus making high frequency AC signals inside the transformer. A separate secondary winding in flyback transformer 28 is coupled to output rectifier and filter circuit 34. When power switch 26 is conducting, energy is stored within the ferromagnetic core material and the secondary winding is non-conducting because of the rectification function of output rectifier and filter circuit 34. When power switch 26 turns off, the secondary winding begins to conduct current, thus emptying the stored energy inside the transformer into output rectifier and filter circuit 34.

The relationship of the energy stored within flyback transformer 28 during each on-time of power switch 26 is given by:

$$\text{Energy} = \frac{L_{pri} \cdot i_{pk}^2}{2} \quad (1)$$

where: $L_{pri}$ is the inductance of the primary windings of flyback transformer 28; and $i_{pk}$ is the peak current through the primary windings of flyback transformer 28.

The stored energy multiplied by the operating frequency of power switch 26 determines the instantaneous power transferred to output 36 as follows:

$$\text{Power} = \frac{f_{op} \cdot L_{pri} \cdot i_{pk}^2}{2} \quad (2)$$

where: $f_{op}$ is the instantaneous operating frequency of power switch 26.

Output rectifier and filter circuit 34 performs the function of recreating the DC output voltage $V_{OUT}$ from the high frequency AC signals from the secondary windings of flyback transformer 28. Output rectifier and filter circuit 34 may comprise a series rectifier and a shunt capacitor (not shown). The rectifier permits current to flow in one direction, i.e. when power switch 26 is non-conducting. The capacitor stores the energy provided by the secondary winding of flyback transformer 28 and delivers energy to output 36.

Voltage feedback circuit 38 reduces the value of the output voltage $V_{OUT}$ at output 36 to a voltage that is equal in value to the reference voltage when the output voltage $V_{OUT}$ is at its nominal value (24 volts DC). Voltage feedback circuit 38 may comprise a conventional resistor divider network. The output signal feedback signal from voltage feedback circuit 38 enables error amplifier 18 to determine whether the output voltage $V_{OUT}$ is at its nominal value.

The output of error amplifier 18 is the error voltage indicating the difference between the reference voltage and the output voltage feedback signal multiplied by the high gain of error amplifier 18. The error voltage assumes a value as needed to keep the output voltage $V_{OUT}$ at its nominal value. The error voltage at node 44 is applied to the non-inverting input of comparator 20 for comparing the error voltage to the current sense signal from current sense circuit 30 delayed by ramp time delay circuit 40 representing the peak current in the power conducting path through flyback transformer 28 and power switch 26. Comparator 20 resets RS latch 22 to turn off power switch 26 by way of buffer 24. Latch 22 resets when the current sense signal exceeds the error voltage at node 44.

Power switch 26 includes a high current, high breakdown voltage MOS power transistor (not shown) having a drain terminal and a source terminal in its current conduction path between flyback transformer 28 and current sense circuit 30. The gate of the MOS power transistor is coupled to the output of buffer 24. Alternately, a bipolar transistor with similar characteristics may be equivalently used for power switch 26.

The error voltage at node 44 is also applied to voltage translator 46 which level shifts the error voltage by a fixed amount. The voltage translator shift allows error amplifier 18 to swing to its full output voltage range thus allowing VCO 42 its full operating range. VCO 42 sets the frequency of operation between say 75 and 130 kilohertz for the switching power supply. The operating frequency of VCO 42 may be higher or lower depending on the application. Each cycle of VCO 42 triggers the set input of RS latch 22 so that its output goes to logic one. The high output signal from the Q-output of latch 22 turns on power switch 26 by way of buffer 24. Buffer 24 boosts the drive levels from the Q-output of RS latch 22 to quickly turn on or turn off power switch 26. When power switch 26 conducts, current flows through the primary winding of flyback transformer 28 to start its energy storage cycle.

Current sense circuit 30 allows comparator 20 to measure the current flowing through the primary winding of flyback transformer 28. Current sense circuit 30 may be a resistor (not shown) where the current flowing through the resistor creates a voltage across the resistor. In an alternate embodiment, current sense circuit 30 may be a current transformer where a secondary winding creates a voltage proportional to the current flowing though the primary winding of the current transformer. Current sense circuit 30 converts the current ramp flowing through power switch 26 into current sense voltage signal representing the current ramp. Thus, the current sense signal from current sense circuit 30 is typically a linearly increasing voltage ramp. The current sense signal is delayed through ramp time delay circuit 40. Ramp time delay circuit 40 may comprise a series resistor and a shunt capacitor (not shown). The slope of the current ramp flowing through power switch 26 is set by the value of the primary inductance of flyback transformer 28, divided into the value of the input voltage at node 17. The current ramp is measured as amperes per microsecond and becomes steeper at higher input voltage values.

Ramp time delay circuit 40 serves to eliminate voltage spikes that appear in the current sense signal by allowing higher values of peak current to flow through flyback transformer 28. Delaying the current sense signal reduces the effective value seen by comparator 20 at a given point in time. If the output voltage $V_{OUT}$ delivers a constant output power, and the input voltage $V_{IN}$ increases, VCO 42 lowers its frequency because the error voltage is lowered with the increasing output voltage $V_{OUT}$. The peak current actually wants to increase instead of decrease as set by the error voltage. Ramp time delay circuit 40 allows a higher difference in actual peak current versus the peak current that is seen by comparator 20 by the nature of a fixed time delay being placed in the path between the current ramp, with a higher rate of change (amperes per microsecond) and comparator 20. This allows the switching power supply to assume a stable operating point where the peak current and switching frequency provide the needed amount of output power.

Consider the scenario where the DC output voltage $V_{OUT}$ is higher than its nominal value (24 volts) because the output load is reduced. The error voltage at node 44 decreases to reflect the difference between the output voltage feedback signal from voltage feedback circuit 38 and the reference voltage $V_{REF}$. The output frequency of VCO 42 drops with the reduced error voltage. Consequently, latch 22 is set at a lower rate and power switch 26 turns on fewer times per second. The energy stored in the primary winding of flyback transformer 28 thus reduces with the fewer conducting times per second of power switch 26. Likewise, the energy transferred through flyback transformer 28 decreases and the DC output voltage $V_{OUT}$ drops back to its nominal value.

Alternately, if the output voltage $V_{OUT}$ is lower than its nominal value (24 volts) because the output load increases. The error voltage at node 44 increases to reflect the difference between the output voltage feedback signal from voltage feedback circuit 38 and the reference voltage $V_{REF}$. The output frequency of VCO 42 rises with the increased error voltage. Consequently, latch 22 is set at a higher rate and power switch 26 turns on more times per second to sink current from the primary windings of flyback transformer 28. The energy stored in the primary winding of flyback transformer 28 thus increases with the more conducting times per second of power switch 26. The energy transferred through flyback transformer 28 increases and the DC output voltage $V_{OUT}$ rises to its nominal value.

Thus, comparator 20 thus serves to set the amount of energy stored within flyback transformer 28 during each on-time by turning off power switch 26 when sufficient energy is stored within flyback transformer 28. The enhancement of the extended range of operation is achieved by varying the switching frequency of the converter through the use of a voltage controlled oscillator to accommodate varying input voltages and loading.

By now it should be appreciated that the enhancement of the extended range of operation of the DC-DC converter of the present invention is enabled by incorporating a VCO in the switching control loop to set the number of on times per second of the power switch to control the energy transferred through the flyback transformer to the output. The switching power supply keeps the power switch operating efficiently over a wide range of input voltages by holding its on-time for a longer period than the minimum effective on-time exhibited by the power switch. The longer on-time period is accomplished by lowering the operating frequency (on-times per second) of the power supply thus requiring the power switch to remain on for a longer period in order to maintain the same output power at higher input voltages. The DC-DC converter functions equally well in positive and negative configurations.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed

1. A switching power supply for converting a first DC voltage to a second DC voltage, comprising:
   an error amplifier having first and second inputs and an output, said first input being coupled for receiving a reference voltage, said second input being coupled for receiving an output voltage feedback signal;
   a comparator having first and second inputs and an output, said first input being coupled to said output of said error amplifier at a first node;
   a voltage controlled oscillator having an input coupled to said first node and having an output;
   a latching circuit having a set input, a reset input and an output, said set input being coupled to said output of said voltage controlled oscillator, said reset input being coupled to said output of said comparator;
   a switching circuit having first and second conduction terminals and a control input, said control input being coupled to said output of said latching circuit;
   circuit means for transforming the first DC voltage to the second DC voltage in response to sinking current from said circuit means through said first conduction terminal of said switching circuit; and
   a current sense feedback circuit coupled between said second conduction terminal of said switching circuit and said second input of said comparator.

2. The switching power supply of claim 1 further including a voltage translator coupled between said first node and said input of said voltage controlled oscillator.

3. The switching power supply of claim 2 further including a voltage reference having an input coupled for receiving the first DC voltage and having an output coupled to said first input of said error amplifier for providing said reference voltage.

4. The switching power supply of claim 3 further including a buffer circuit having an input coupled to said output of said latching circuit and having an output coupled to said control input of said switching circuit.

5. The switching power supply of claim 4 further including a voltage feedback circuit having an input coupled for receiving the second DC voltage and having an output coupled to said second input of said error amplifier for providing said output voltage feedback signal.

6. The switching power supply of claim 5 wherein said circuit means includes:
   a flyback transformer having first and second power terminals and a power control input, said first power terminal being coupled for receiving the first DC voltage, said power control input being coupled to said first power terminal of said switching circuit; and
   an output rectifier having an input coupled to said second power terminal of said flyback transformer and having an output coupled for providing the second DC voltage.

7. The switching power supply of claim 6 wherein said current sense feedback circuit includes:
   a current sense circuit coupled in series with said second conduction terminal of said switching circuit for providing a current sense signal at an output; and
   a time delay circuit having an input coupled for receiving said current sense signal and having an output coupled to said second input of said comparator.

8. A switching power supply for converting a first DC voltage to a second DC voltage, comprising:
   a voltage reference circuit having an input coupled for receiving the first DC voltage and having an output for providing a reference voltage;
   an error amplifier having first and second inputs and an output, said first input being coupled for receiving said reference voltage, said second input being coupled for receiving an output voltage feedback signal;
   a comparator having first and second inputs and an output, said first input being coupled to said output of said error amplifier at a first node;
   a voltage controlled oscillator having an input coupled to said first node and having an output;
   a latching circuit having a set input, a reset input and an output, said set input being coupled to said output of said voltage controlled oscillator, said reset input being coupled to said output of said comparator;
   a switching circuit having first and second conduction terminals and a control input, said control input being coupled to said output of said latching circuit;
   a flyback transformer having first and second power terminals and a power control input, said first power terminal being coupled for receiving the first DC voltage, said second power terminal providing the second DC voltage, said power control input being coupled to said first conduction terminal of said switching circuit; and
   a current sense feedback circuit coupled between said second conduction terminal of said switching circuit and said second input of said comparator.

9. The switching power supply of claim 8 further including a voltage translator coupled between said first node and said input of said voltage controlled oscillator.

10. The switching power supply of claim 9 further including a buffer circuit having an input coupled to said output of said latching circuit and having an output coupled to said control input of said switching circuit.

11. The switching power supply of claim 10 further including a voltage feedback circuit having an input coupled for receiving the second DC voltage and having an output coupled to said second input of said error amplifier for providing said output voltage feedback signal.

12. The switching power supply of claim 11 further including an output rectifier having an input coupled to said second power terminal of said flyback transformer and having an output coupled for passing the second DC voltage.

13. The switching power supply of claim 12 wherein said current sense feedback circuit includes:
   a current sense circuit coupled in series with said second conduction terminal of said switching circuit for providing a current sense signal at an output; and
   a time delay circuit having an input coupled for receiving said current sense signal and having an output coupled to said second input of said comparator.

14. A switching power supply for converting a first DC voltage to a second DC voltage, comprising:
   an error amplifier having first and second inputs and an output, said first input being coupled for receiving a reference voltage, said second input being coupled for receiving an output voltage feedback signal;
   a comparator having first and second inputs and an output, said first input being coupled to said output of said error amplifier at a first node;
   a voltage translator having an input coupled to said first node and having an output;
   a voltage controlled oscillator having an input coupled to said output of said voltage translator and having an output;
   a latching circuit having a set input, a reset input and an output, said set input being coupled to said output of said voltage controlled oscillator, said reset input being coupled to said output of said comparator;
   a switching circuit having first and second conduction terminals and a control input, said control input being coupled to said output of said latching circuit;
   circuit means for transforming the first DC voltage to the second DC voltage in response to sinking current from said circuit means through said first conduction terminal of said switching circuit;
   a current sense circuit coupled in series with said second conduction terminal of said switching circuit for providing a current sense signal at an output; and
   a time delay circuit having an input coupled for receiving said current sense signal and having an output coupled to said second input of said comparator.

15. The switching power supply of claim 14 further including a voltage reference circuit having an input coupled for receiving the first DC voltage and having an output coupled to said first input of said error amplifier for providing said reference voltage.

16. The switching power supply of claim 15 further including a buffer circuit having an input coupled to said output of said latching circuit and having an output coupled to said control input of said switching circuit.

17. The switching power supply of claim 16 further including a voltage feedback circuit having an input coupled for receiving the second DC voltage and having an output coupled to said second input of said error amplifier for providing said output voltage feedback signal.

18. The switching power supply of claim 17 wherein said circuit means includes:

a flyback transformer having first and second power terminals and a power control input, said first power terminal being coupled for receiving the first DC voltage, said power control input being coupled to said first power terminal of said switching circuit for receiving; and an output rectifier having an input coupled to said second power terminal of said flyback transformer and having an output coupled for providing the second DC voltage.

* * * * *